Figure 1:
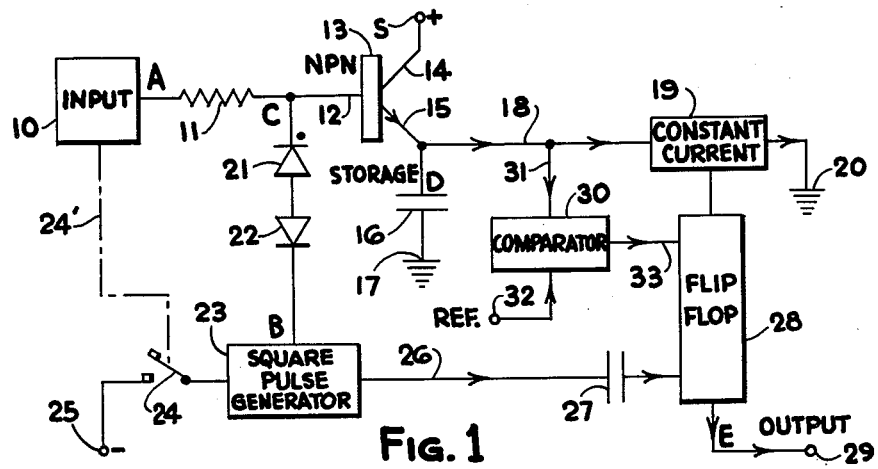

Sept. 11, 1962           B. STEFANOV           3,053,996
CIRCUIT FOR THE CONVERSION OF AMPLITUDE
PULSES TO TIME DURATION PULSES
Filed July 13, 1959

*INVENTOR*
BORIS STEFANOV
BY
*Elliott & Pastoriza*
ATTORNEYS

United States Patent Office 3,053,996
Patented Sept. 11, 1962

3,053,996
CIRCUIT FOR THE CONVERSION OF AMPLITUDE PULSES TO TIME DURATION PULSES
Boris Stefanov, Glendale, Calif., assignor to Kauke & Company, Inc., a corporation of California
Filed July 13, 1959, Ser. No. 826,606
7 Claims. (Cl. 307—88.5)

This invention relates to an improved electrical circuit for converting the amplitude of an input pulse of electrical energy into a time duration of an output pulse of electrical energy in which the time duration is directly proportional to the amplitude.

It is well known in the art that detection and recording of intelligence transmitted by means of frequencies or time differences is far more accurate than the detection and recording of intelligence transmitted by amplitude modulation or amplitude differences. This is because frequencies or time differences cannot only be measured with greater accuracy, but are generally independent of varying amplitudes of the received signal as a consequence of noise, spuriously generated signals, and the like. Most present day transducers such as employed in telemetering systems for example, provide an output signal, however, whose magnitude or voltage amplitude is a function of the parameter being measured. It is, therefore, desirable to convert such amplitudes into frequency modulated signals or proportional time durations prior to transmission. The detection and recording at a ground station of these converted signals will then be substantially independent of noise or other spuriously generated signals.

In the case of high altitude instrumented missiles, any additional electrical networks added for the foregoing purposes must of necessity be of minimum weight and size. Moreover, it is important that transient signals and the like in the original amplitude modulated output not affect the converting circuit in order that the resulting output time duration pulse reflect a true indication of the steady state amplitude of the input pulse. In addition, the converting circuit itself must be capable of rapidly converting a series of different amplitude input pulses into time duration pulses with minimum "reset" time between pulses to the end that maximum information can be transmitted within given time periods.

Bearing the foregoing in mind, it is a primary object of the present invention to provide a greatly improved circuit for converting only the steady state amplitude portion of an input pulse of electrical energy into a time duration of an output pulse, in which such time duration is directly proportional to the input amplitude whereby the advantages of increased accuracy by use of frequency or time modulation in the transmission of intelligence is realized.

More particularly, it is an object to provide a circuit of the foregoing type which is extremely simple and economical to manufacture, and which employs a minimum number of components to the end that the circuit itself may be made of small mass and of compact dimensions.

Another important object is to provide a circuit meeting the foregoing objects in which "reset" time between an output pulse and a subsequent input pulse is substantially zero.

Briefly, these and many other objects and advantages of the invention are attained by providing a storage means responsive to the input pulse for storing an electrical charge proportional to the steady state amplitude of the input pulse. This charging is effected by a keying circuit connected to select a given time portion of the input pulse. A constant discharge current means in turn is connected to the storage means and suitable control means are provided for actuating the discharge means to discharge the storage means at a constant rate such that the duration of time for discharging is proportional to the initial amplitude of the voltage build up in the storage means. An output pulse generating means is connected to the control means and the discharge means and serves to initiate the generation of the output pulse in response to initiation of the discharge means by the control means. The output pulse in turn is terminated in response to termination of the discharge means so that the time duration of the output pulse is proportional to the original input amplitude. Since the storage means is discharged to the same voltage level for each conversion of an amplitude to a time duration pulse, the entire circuit is in readiness to receive the next pulse and no "reset" time is necessary.

Figure 2:
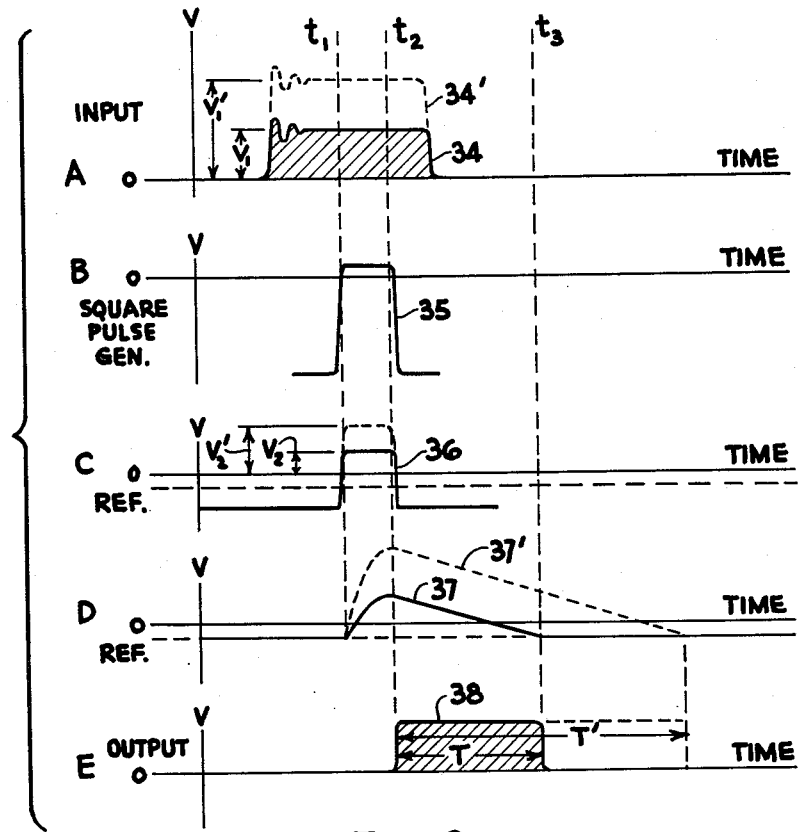

A better understanding of a preferred embodiment of the invention will now be had by referring to the accompanying drawings in which:

FIGURE 1 is a block diagram partly schematic in form illustrating one embodiment of the converting circuit of the invention; and FIGURE 2 illustrates a series of time graphs of various wave forms at various points in the circuit of FIGURE 1 useful in explaining the operation of the circuit.

Referring first to FIGURE 1, the circuit includes an input 10 which may include a portion of a commutator circuit employed in a time multi-plex telemetering system. On the other hand, the input may simply provide an amplitude signal passed directly from a single transducer or other input amplitude pulse generating equipment wherein it is desired to convert the steady state amplitude of the input pulse to a time duration pulse.

As shown, the input pulse passes through a resistance 11 to the base terminal 12 of an emitter-follower transistor 13 having conventional collector and emitter terminals 14 and 15. The emitter terminal 15 is connected to a storage means comprising a single storage condenser 16 the other side of which is grounded at 17. A discharge path for the condenser 16 is provided by a lead 18 connected to the junction of the emitter terminal 15 and condenser 16 and passing through a constant current network 19 to ground at 20.

In addition to the input 10, the input portion of the circuit includes a Zener type diode 21 and reverse current blocking diode 22 in back to back relationship connected between the junction of the resistance 11 and base terminal 12 at one end and to a square pulse generator 23 at its other side. Energization of the square pulse generator 23 is effected by a keying switch arm 24 arranged to pass a negative trigger pulse to the generator from an input terminal 25. The operation of the keying switch 24 may be effected automatically by the input 10 through a ganged connection indicated at 24'.

The output of the square pulse generator also passes through a lead 26 to a simple differentiating condenser 27 for providing a negative trigger pulse from the trailing edge of square pulse to trigger a flip-flop circuit 28. The flip-flop circuit 28 serves as an output pulse generating means for providing an output pulse of a time duration proportional to the amplitude of the input pulse. This time duration output pulse can then be transmitted or otherwise employed as a time duration signal by suitable connections to the output terminal 29.

Termination of the operation of the output pulse generating circuit or flip-flop 28 is effected by a comparator network 30 provided with signals from the discharge lead 18 as indicated at 31 and from a suitable reference voltage applied at a terminal 32. By this arrangement, the comparator circuit 30 will pass a trigger pulse through its output line 33 to the flip-flop circuit 28 to terminate its operation when the voltage supplied through lead 31 corresponds substantially to the reference voltage applied to the terminal 32.

Referring now to FIGURE 2, the operation of the circuit will be described. In FIGURE 2, the voltage wave forms A, B, C, D, and E represent approximately the voltages as would appear at the correspondingly lettered portions of FIGURE 1. Thus, referring to graph A, there is illustrated a representative input pulse 34 of amplitude $V_1$ shown in solid lines. A short time after reception of this input pulse at the input 10, the square pulse generator 23 is keyed by closing of the key switch 24. This keying can be accomplished manually or in response to the reception of the input pulse at the input 10. A square pulse is thereby generated of a given time duration as indicated at 35 in graph B. This given time duration is denoted by the vertical dashed time lines $t_1$ and $t_2$. Any input signals received which fall outside the time duration $t_1-t_2$ will be shunted from the input base terminal 12 of the transistor 13 by the Zener diode 21. Undesired spurious signals such as initial transients as indicated schematically in the graph A of FIGURE 2 are, therefore, eliminated from affecting the circuit, and only the average or steady state amplitude of the input pulse as exists between the time limits $t_1$ and $t_2$ will be effective.

The above described selected portion of the input pulse is caused to be passed to the base terminal 12 as a consequence of the generation of the square pulse 35 at the lower end of the Zener diode 21. This square pulse effectively raises the voltage appearing at the lower terminal of the diode so that the net voltage across the diode is of a value less than the Zener voltage at which current discharge can take place through the diode thereby effectively blocking any current flow through the diode to the circuit of the square pulse generator. The resulting voltage appearing at the base terminal 12 is indicated at 36 and is of amplitude $V_2$ as shown in graph C. The amplitude $V_2$ is directly proportional to the steady state amplitude of the input pulse between the time limits $t_1-t_2$. Effectively, the Zener diode operates as a shunting switch which is open only during the period of the square pulse defined from $t_1$ to $t_2$.

With the voltage $V_2$ applied to the base terminal 12 of the transistor 13, current will flow from the current source S through the collector 14, transistor body, and out emitter 15 to charge the storage condenser 16. Since the emitter voltage follows the base voltage, the condenser 16 will be charged to a voltage proportional to the voltage amplitude of the original input pulse, but the charging time will be relatively rapid in view of the current amplification effected by the transistor action. This charging voltage curve and the subsequent voltage across the condenser 16 is illustrated at 37 in graph D of FIGURE 2.

Upon termination of the square pulse 35 at time $t_2$, the voltage across the Zener diode will exceed the Zener voltage and the corresponding voltage drop at the base terminal 12 will render the transistor non-conducting. At the same time, the trailing edge of this square pulse passing through the lead 26 and differentiating condenser 27 will trigger the flip-flop circuit 28 to initiate generation of an output time duration pulse. This output pulse is shown at 38 in graph E of FIGURE 2. The flip-flop circuit 28 in turn is connected to trigger the constant current network 19 to initiate discharging of the storage condenser 16.

The constant current discharge curve for the storage condenser 16 through the constant current network 19 is represented by the rectilinear sloped portion of the graph 37. This voltage portion of the curve is received in the comparator circuit 30 through the lead 31 and compared with a reference voltage applied to the terminal 32. This reference voltage is indicated in graphs C and D by the dashed lines and is slightly below zero. The comparator circuit is such that when the voltage across the condenser 16 reaches a value corresponding to the reference voltage as a consequence of the discharge, a signal will be provided to terminate operation of the flip-flop circuit 28 through the lead 33. Termination of the operation of the flip-flop circuit in turn will terminate generation of the output impulse 38 at a time indicated in the various graphs at $t_3$ and thus the duration of the output pulse 38 will be proportional to the original amplitude of the input pulse. By making the reference voltage less than zero, there will be provided a finite output pulse of a given time duration corresponding to a zero voltage amplitude input pulse.

In the event the input pulse is of a larger amplitude such as indicated at 34' in graph A of FIGURE 2, the corresponding voltage during the selected period determined by the square wave 35 appearing at the base terminal 12 will be of a higher amplitude as indicated by $V_2'$ in graph C. Accordingly, the voltage of the emitter 15 which follows the base voltage will result in a charging of the condenser 16 in accordance with the dotted curve 37' illustrated in graph D. Operation of the constant current network 19 will thus take place for a longer period since a greater length of time is required to discharge the condenser to the reference voltage and, therefore, the time duration of the output pulse 38 will be extended from T to the period T' as indicated in graph E.

An extremely important feature of the foregoing circuit resides in the fact that the condenser always discharges to the same reference voltage and, therefore, is in immediate condition for recharging upon reception of the next pulse. There is, accordingly, no "reset" time as the circuit is always ready after termination of the output pulse for reception of the next input pulse. Moreover, it will be evident that since the constant current discharge network and flip-flop circuit 28 are operated simultaneously, the time duration of the output pulse will always be proportional to the discharge time which in turn is proportional to the initial voltage to which the storage condenser 16 is charged through the transistor circuit.

Finally, as a consequence of the use of the Zener diode and square pulse generator, any desired selected time portion of the input pulse can be employed for controlling the transistor 13 and thus undesirable transients or spurious signals can be eliminated by proper selection of a given portion of the input pulse for sampling.

Minor modifications and substitution of equivalent components in the circuit as described as clearly fall within the scope and spirit of this invention will readily occur to those skilled in the art. The circuit for converting amplitude pulses to time duration pulses is, therefore, not to be thought of as limited to the specific embodiment set forth for illustrative purposes.

What is claimed is:

1. A circuit for converting an amplitude input pulse to a time duration output pulse comprising: storage means responsive to said input pulse for storing an electrical charge proportional to said amplitude; constant current discharge means connected to said storage means; control means for actuating said discharge means for discharging said storage means, the duration of time for said discharging being proportional to said amplitude; and output pulse generating means connected to said control means and discharge means and including means for initiating generation of said output pulse in response to initiation of said discharge means by said control means, and including means terminating the generation of said output pulse in response to termination of said discharge means, whereby the time duration of said output pulse is proportional to said amplitude.

2. A circuit for converting the amplitude of an input pulse to a time duration of an output pulse comprising:

a storage condenser; means responsive to said input pulse for charging said storage condenser to a voltage proportional to said amplitude; a constant current discharge means connected to said condenser; output pulse generating means; means for actuating said constant current discharge means and said output pulse generating means substantially simultaneously to initiate generation of said output pulse when said condenser begins to discharge; and means responsive to the voltage across said condenser to terminate generation of said output pulse when said voltage across said condenser is reduced to a given reference voltage as a consequence of said constant current discharge whereby the time duration of said output pulse is proportional to the amplitude of said input pulse.

3. The subject matter of claim 2, in which said means for charging said storage condenser includes a keying circuit for selecting a given time portion of said input pulse and a current amplifying means operable only during said given time portion for providing a charging current proportional to the amplitude of said input pulse during said given time portion, transient signals characterizing the leading edge of said input pulse being outside said given time portion.

4. A circuit for converting the amplitude of an input pulse of electrical energy into a time duration of an output pulse of electrical energy in which said time duration is directly proportional to said amplitude, said circuit comprising, in combination: an input means receiving said input pulse; a keying circuit for selecting a given time portion of said input pulse; a storage condenser; first means responsive solely to said given time portion of said input pulse for charging said storage condenser to a voltage directly proportional to the amplitude of said given time portion; a time duration output pulse generator connected to said keying circuit and responsive to the termination of said given time portion to initiate the generation of said output pulse; a constant current discharge means connected to said condenser and said output pulse generator and responsive to the initiation of said output pulse to discharge said condenser at a constant current rate; a source of reference voltage; and a comparing means connected to said output pulse generating means responsive to said reference voltage and the voltage across said condenser for terminating the generation of said output pulse at a time when said voltage across said condenser, as a consequence of said constant current discharge, substantially equals said reference voltage, whereby the time duration of said output pulse is directly proportional to said amplitude of said input pulse.

5. The subject matter of claim 4, in which said first means includes an emitter-follower transistor having base, collector, and emitter terminals, said base terminal being connected to said input means and said emitter terminal being connected to said storage condenser; and a source of charging current connected to said collector terminal; said keying circuit including a square pulse generator and zener diode means connected between said square pulse generator and said base terminal for holding the voltage at said base terminal at a value at which said transistor is non-conductive in the absence of a square wave pulse from said generator, keying of said generator generating said square wave pulse to render said zener diode nonconductive whereby said given portion of said input pulse is passed to said base terminal to enable charging current to pass through said transistor within the period of said square wave pulse.

6. The subject matter of claim 5, in which said input means include a voltage dividing resistance in series with said base terminal, said diode being connected at the junction of said resistance and base terminal, said output pulse generator comprising a flip-flop circuit; and a differentiating condenser connected between said flip-flop circuit and said square pulse generator for generating a negative trigger pulse from the trailing edge of said square wave to energize said flip-flop circuit.

7. The subject matter of claim 4, in which said keying circuit is connected to said input means for energization after the leading edge of said input pulse is received in said input means whereby initial transient signals in said input pulse are excluded from said given portion.

References Cited in the file of this patent

UNITED STATES PATENTS

| | | |
|---|---|---|
| 2,553,284 | Sunstein | May 15, 1951 |
| 2,875,382 | Sandin | Feb. 24, 1959 |
| 2,922,879 | Vogt et al. | Jan. 26, 1960 |